G. F. DIAMOND & E. T. RICHARDS.
AUTO TIRE SIGNAL PRESSURE GAGE.
APPLICATION FILED AUG. 24, 1915.

1,215,782.

Patented Feb. 13, 1917.

Witnesses
Fenton S. Belt
J. W. Sherwood

Inventors
G. F. Diamond and
E. T. Richards
By Franklin N. Hough
Attorney

UNITED STATES PATENT OFFICE.

GEORGE FREDERICK DIAMOND AND EDWARD T. RICHARDS, OF KINGSTON, NEW YORK.

AUTO-TIRE SIGNAL PRESSURE-GAGE.

1,215,782.

Specification of Letters Patent. Patented Feb. 13, 1917.

Application filed August 24, 1915. Serial No. 47,111.

*To all whom it may concern:*

Be it known that we, GEORGE F. DIAMOND and EDWARD THOMAS RICHARDS, citizens of the United States, residing at Kingston, in the county of Ulster and State of New York, have invented certain new and useful Improvements in Auto-Tire Signal Pressure-Gages; and we do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in auto tire signal pressure gages for use in inflating pneumatic tires and consists essentially in the provision of a gage indicating certain pressure at which a signal is desired to be given when the tire is being inflated.

Our invention consists of a simple and efficient device of this nature, having various details of construction, combinations and arrangements of parts which will be hereinafter fully described, shown in the accompanying drawings and then specifically defined in the appended claims.

Our invention is illustrated in the accompanying drawings, in which.

Figure 1:
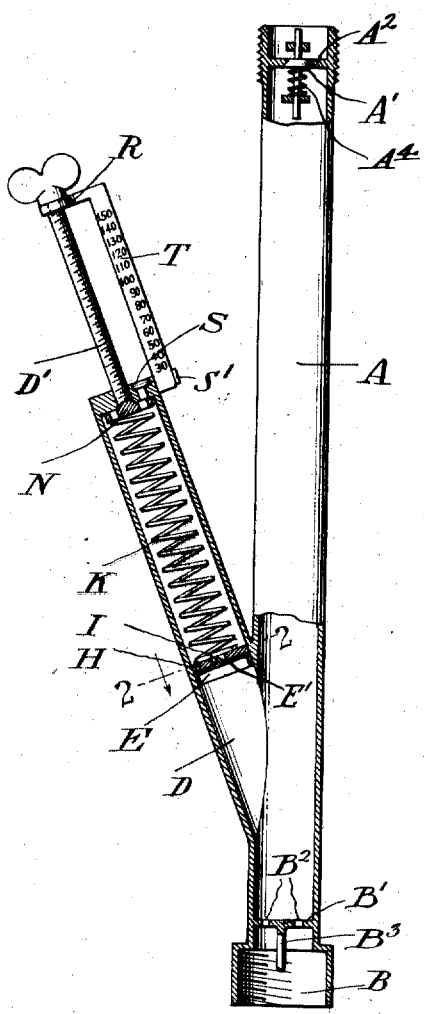
Figure 1 is a vertical central sectional view, parts being shown in elevation.
Figure 2:
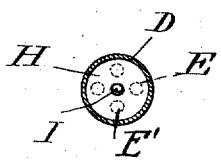
Fig. 2 is a sectional view on line 2—2 of Fig. 1.

Reference now being had to the details of the drawings by letter, A designates a pipe which is adapted to be connected at one end with an air supply pipe and near the end of the pipe which is to be connected is formed a partition A² having a valve A' controlling the opening therein, said valve being held to its seat through the medium of the spring A⁴. The opposite end B of the pipe is enlarged and interiorly threaded to engage over the threaded portion of a valve upon the tire of an automobile and adjacent to the enlarged end is a partition B' with perforations B² therein, and B³ designates a pin projecting from the partition B' and is adapted for the purpose of releasing the valve upon the tire to be inflated as the pipe A is screwed about the casing of the valve upon the tire. Communicating with the pipe A at an angle thereto is a pipe D, having a partition E therein having apertures E' and provided with a pin valve I, and H is a piston which is centrally apertured to receive the pin valve I. K is a coiled spring bearing at one end against the piston and its other end is secured to a disk N fastened to the screw D', which latter is mounted in a threaded aperture in the end of the pipe D. A whistle S is formed in the end of the pipe D and serves as a signal when the pressure of the air reaches a certain limit. A gage T is provided with a laterally extending arm R which is apertured for the reception of the screw D', which is swiveled therein and is movable through an aperture S' formed in the wall of the pipe.

In operation, the thumb screw is turned to adjust the tension of the spring K to the desired pressure of air which it is desired to put upon the tire to be inflated, the amount of pressure being indicated on the gage T. The air is then introduced through the valve-regulated opening A' and, when the tire is filled with air to the desired pressure, the whistle will give a signal, announcing that the desired pressure has been obtained, after which the supply of air may be cut off.

What we claim to be new is:—

1. An automobile tire signal pressure gage comprising a pipe for attachment to the valve casing of a tire and provided with a valve therein, a branching pipe with an apertured partition therein, a pin valve upon said partition, an apertured valve piston within the branching pipe, a screw fitted in a threaded aperture in one end of the branching pipe, a disk fitted to the end of the screw and a spring interposed between the disk and piston valve, a gage having an angled end which is apertured and in which said screw has swiveled connection, the wall of the branching pipe provided with a guide aperture in which said gage has an adjustable movement.

2. A safety valve comprising a pipe with an apertured partition therein, a pin valve upon said partition, an apertured valve piston within said pipe, a screw fitted in a threaded aperture in one end of the pipe, a disk fitted to the end of the screw and a spring interposed between the disk and piston valve, a gage having an angled end which is apertured and in which said screw has swiveled connection, the wall of the pipe provided with a guide aperture in which said gage has an adjustable movement.

In testimony whereof we hereunto affix our signatures in presence of two witnesses.

GEORGE FREDERICK DIAMOND.
EDWARD T. RICHARDS.

Witnesses:
   AUGUSTUS SHUFELDT,
   HUGH DIAMOND.